Figure 1:
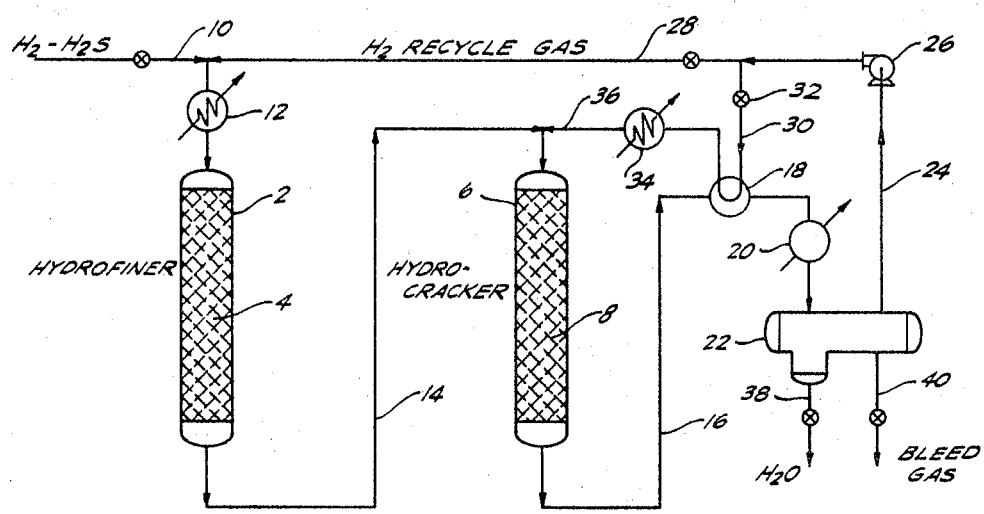

INVENTORS
FREDERICK C. WOOD
ROLAND O. DHONDT
GEORGE D. CHEADLE

ATTORNEY

United States Patent Office 3,458,433
Patented July 29, 1969

3,458,433
ACTIVATION OF HYDROFINING-HYDROCRACKING CATALYST SYSTEMS
Frederick C. Wood, Fullerton, Roland O. Dhondt, Long Beach, and George D. Cheadle, Fullerton, Calif., assignors to Union Oil Company of California, Los Angeles, Calif., a corporation of California
Filed June 14, 1966, Ser. No. 557,491
Int. Cl. C10g 13/02, 37/06, 23/02
U.S. Cl. 208—89
14 Claims This invention relates to new methods for preconditioning and activating a series train of hydrofining and hydrocracking catalyst beds so as to convert both catalysts from their initial oxidized state to other more active forms, e.g., sulfided and/or reduced forms. The invention is particularly concerned with catalyst systems wherein the hydrofining and hydrocracking catalyst beds are arranged in series so that the vapor effluent from the hydrofining catalyst bed must pass through the hydrocracking catalyst bed, and wherein the hydrocracking catalyst is hydrothermally unstable, i.e., susceptible to damage when contacted with water vapor at elevated temperatures. The basic objectives of the invention are to provide safe and economical means for presulfiding the hydrofining catalyst in such a system without damaging the hydrocracking catalyst with the water generated during sulfiding of the hydrofining catalyst, and also to convert the hydrocracking catalyst to a more active, reduced and/or sulfided form.

In broad aspect, the new activation procedure consists in circulating a gaseous mixture comprising essentially hydrogen and hydrogen sulfide in series through the hydrofining catalyst bed, and then through the hydrocracking catalyst bed, while gradually raising the inlet gas temperatures to each catalyst bed in a controlled manner to effect heat-up of the respective catalyst beds in staggered sequence to be described more particularly hereinafter, all in such manner as to minimize the damaging effects on the hydrocracking catalyst of water vapor generated by the sulfiding of metal oxides on the hydrofining catalyst, while at the same time reducing to a minimum the overall time required for the activation.

More specifically, starting with both catalyst beds at relatively low temperatures of e.g., 100–150° F., the hydrofining catalyst temperature is increased fairly rapidly to levels above about 550° F., and maintained at such high temperatures for a considerable period of time, during which time the temperature in the hydrocracking catalyst bed is increased to an intermediate level between about 250–450° F., and held at such intermediate temperatures until high-temperature sulfiding of the hydrofining catalyst is substantially completed. Upon completion of sulfiding of the hydrofining catalyst, the hydrocracking catalyst bed temperature is raised gradually while carefully controlling water vapor partial pressure therein until terminal temperatures in excess of 550° F. are reached, and such terminal temperatures are maintained for a sufficient time to effect substantial dehydration, reduction and/or sulfiding of the catalyst. Upon completion of the desired sulfiding of the hydrofining catalyst, and activation of the hydrocracking cataylst, temperature levels in each bed may be reduced to lower levels preparatory to hydrocracking process start-up procedures with hydrocarbon feedstocks, as described for example in U.S. Patent No. 3,186,936. The activation procedures of this invention are found to result in maximum activities of both the hydrofining and hydrocracking catalysts, as compared to other procedures wherein both catalysts beds are heated simultaneously to similar temperature levels.

The basic problem dealt with herein is the activation of "integral" hydrofining-hydrocracking catalyst systems wherein the effluent from the hydrofining catalyst, or some substantial portion thereof, must pass through the hydrocracking catalyst bed. Such systems include those wherein both catalyst beds are enclosed in the same reactor, in which case it is obviously impractical to provide independent fluid inlet and outlet facilities for each bed. Also included are those systems wherein the catalyst beds are enclosed in separate reactors connected by a fluid transfer line, for even in these systems a substantial added expense is involved in providing independently controlled fluid inlet and outlet facilities for each reactor. In systems where such independent fluid inlet and outlet facilities are provided, as in conventional non-integral hydrofining-hydrocracking combinations, the process of this invention may also be utilized, but may be of less advantage than other available activation procedures.

Hydrofining catalysts

The hydrofining catalysts employed herein, in their initial calcined state, may comprise any of the Group VIII and/or Group VI-B metal oxides, or any desired mixtures thereof. Preferably an iron group metal oxide, e.g., cobalt oxide or nickel oxide, is employed in combination with a Group VI-B metal oxide such as molybdenum oxide or tungsten oxide. These active metal oxides may be employed in undiluted form, but preferably they are supported on a granular adsorbent carrier of the difficulty-reducible metal oxide type which has a relatively low cracking activity, e.g., activated alumina, silica gel, zirconia, titania, activated clays and the like. Such catalysts are relatively stable hydrothermally, as compared to the hydrocracking catalysts described hereinafter. Preferably, the carrier should have a cat-A cracking Activity Index below about 25. Preferred carriers comprise activated alumina, and activated alumina stabilized with a minor proportion, e.g., 3–15% by weight, of coprecpitated silica gel. Specifically preferred hydrofining catalysts may comprise from aboit 2–10% by weight of cobalt oxide or nickel oxide, and 5–30% by weight of molybdenum oxide or tungsten oxide, supported on a pelleted alumina-silica co-gel containing about 5% $SiO_2$. Such catalysts are normally prepared by impregnating the pelleted carrier with aqueous solutions of salts of the desired metals, followed by draining, drying and calcining to convert the the active metals to oxide forms.

Hydrocracking catalysts

The hydrocracking catalysts to be activated herein may in general comprise any desired combination of a refractory solid cracking base with a Group VIII metal oxide hydrogenating component, wherein the resulting composite is susceptible to damage by water vapor at temperatures above about 400° F., and which is relatively unaffected by water vapor at temperatures below about 400° F. The hydrothermal damage which can effect such catalysts is of two general types. Firstly, the cracking base itself may be adversely affected with resultant loss of surface area, and/or crystallinity where a crystalline zeolite base is employed. Secondly, irrespective of the nature of the cracking base, the Group VIII metal hydrogenating component, particularly the noble metals such as palladium and platinum, may tend to become agglomerated into larger particles, with resultant loss in hydrogenating activity. Thus, the activation procedure of this invention is designed particularly for use in connection with hydrocracking catalysts which comprise a Group VIII noble metal hydrogenating component and/or wherein the cracking base is a crystalline zeolite deficient in stabilizing zeolitic metal ions. Of primary concern are the catalysts comprising a hydrogen and/or "decationized" alumino-silicate zeolite cracking base upon which is deposited e.g., about 0.1–10% by weight of a Group VIII metal.

The preferred zeolite cracking bases of this invention are partially dehydrated crystalline compositions composed usually of a silica-alumina crystal lattice combined with one or more types of exchangeable cations such as sodium, hydrogen, magnesium, calcium, etc. They are further characterized by crystal pores of relatively uniform diameter between about 6 and 14 angstroms. Several crystal forms of such zeolites are now available and suitable for use herein, e.g., those of the X, Y, or L crystal types, or synthetic mordenite. It is preferred to employ zeolites having a relatively high $SiO_2/Al_2O_3$ mole ratio, between about 2.5 and 12, preferably between about 3 and 8. In particular the Y molecular sieves having crystal pore diameters of about 9–12 angstroms, and wherein the $SiO_2/Al_2O_3$ ratio is about 4–6, are preferred, either in their hydrogen form, or a polyvalent metal form, or mixed hydrogen-polyvalent metal forms. The most active bases are those wherein the exchangeable zeolitic cations are hydrogen, a divalent metal such as magnesium or zinc, or a trivalent metal such as the rare earth metals, chromium or aluminum.

Normally, these zeolites are prepared first in the sodium form, but it is preferred that or all of the monovalent metal be ion-exchanged out with a polyvalent metal, or where a hydrogen form is desired, with an ammonium salt followed by heating to decompose the zeolitic ammonium ion and leave a hydrogen ion. In some cases, as in the case of synthetic mordenite, the hydrogen forms can be prepared by direct acid treatment of the alkali metal zeolites. The preferred hydrogen zeolites of the Y crystal type, as well as the "decationized" forms thereof, are described more particularly in U.S. Patent No. 3,130,006.

A particularly preferred type of hydrocracking catalyst consists of about 0.2–2.0% by weight of palladium supported on a Y molecular sieve wherein the zeolitic cations are predominantly hydrogen ions and/or magnesium ions. These preferred catalysts, as well as other types described above, are preferably prepared by first subjecting the initial sodium zeolite to ion exchange with an ammonium salt, followed by a partial back-exchange with a magnesium salt, or other polyvalent metal, follower by a final ion exchange step with the desired hydrogenating metal salt. The resulting composition is then carefully dried and calcined to decompose remaining ammonium ions and convert the hydrogenating metal to an oxide form.

Detailed process description

Figure 2:
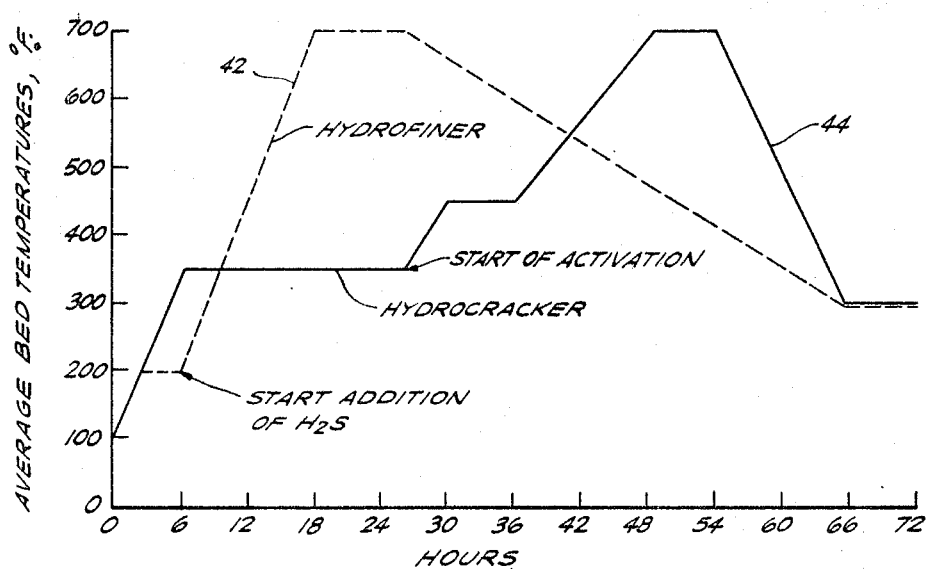

For a more detailed description of the invention, reference is made to the accompanying drawings, wherein FIGURE 1 is a simplified flow diagram illustrating the mechanics of the preferred heat-up and activation procedure using an internal recycle of heating gas, and FIGURE 2 is a graph of an illustrative time-temperature program for the activation technique described in connection with FIGURE 1.

Referring more particularly to FIGURE 1, at the outset of the activation, hydrofining reactor 2 is filled with a suitable bed or beds of hydrofining catalyst 4, while hydrocracking reactor 6 is filled with a suitable bed or beds of hydrocracking catalyst 8, both catalysts being in an oxidized state resulting either from the initial calcination of fresh catalyst, or the oxidative regeneration of previously deactivated catalyst. With the system at substantially ambient temperatures and pressures, and purged of oxygen-containing gases, hydrogen-rich recycle gas is introduced to hydrofiner 2 via line 10 and preheater 12, and preferably circulated through the system for a sufficient time to sweep out (via line 40) any inert purge gas remaining in the system from the preceding oxygen purge. The system is then closed for pressuring and total recycle of activation gases to the respective reactors.

After purging, the recycle gas flow is through hydrofiner 2, transfer line 14, hydrocracker 6, transfer line 16, heat-exchanger 18, cooler 20, high-pressure separator 22, recycle gas line 24, recycle gas compressor 26, and recycle gas line 28. A portion of the recycle gas in line 28 is diverted via line 30 controlled by valve 32, passed through exchanger 18 and hydrocracker recycle gas preheater 34, and thence via line 36 into hydrocracker 6. By controlling the amount of gas diverted via line 30, and the temperature in preheater 34, independent control is provided of the inlet gas temperatures to reactors 2 and 6. In cooler 20, the total effluent gases from the system are normally cooled down to temperatures in the range of about 30–150° F., with resultant condensation of water in high-pressure separator 22, the condensed water being withdrawn via line 38. The bulk of this water is chemically generated during activation by the reduction and/or sulfiding of the reducible active metals on the respective catalysts. Valved transfer line 40 from high-pressure separator 22 goes to a conventional low-pressure separator not shown, and during the activation is used only as a bleed line to relieve pressure generated during heat-up.

With vent line 40 closed, the system is pressured up to desired activation pressures by the continued introduction of hydrogen-rich gas via line 10. The activation may be carried out at atmospheric pressures or below, but for reasons of economy it is generally preferred to operate at superatmospheric pressures of e.g., about 500–2,000 p.s.i.g. Suitable gas rates to each reactor during the activation may range between about 5 and 300, preferably between about 30 and 100 s.c.f. per pound of catalyst per hour.

With the system at desired pressure, the activation procedure is initiated by gradually raising inlet gas temperatures to the respective reactors by means of preheaters 12 and 34, according to schedules described more particularly in connection with FIGURE 2. The introduction of hydrogen sulfide to the system can be commenced substantially as soon as the desired pressure is reached, but normally it is preferable to start the sulfiding cycle when the inlet gas temperature to hydrofiner 2 is in the range of about 150–250° F.

Referring more particularly to FIGURE 2, broken line graph 42 illustrates a suitable average bed temperature schedule for hydrofiner 2, while solid line graph 44 illustrates a suitable average bed temperature schedule for hydrocarcking reactor 6. These graphs are based on total gas rates to reactor 2 of about 20–40 s.c.f. per pound of catalyst per hour, and about 35–55 s.c.f. per pound of catalyst per hour in reactor 6. Further, it is assumed that the hydrofining catalyst contains about 4–6% nickel oxide or cobalt oxide, and 10–20% by weight of molybdenum oxide or tungsten oxide, while the hydrocracking catalyst in reactor 6 contains about 1% by weight of palladium. The average bed temperatures depicted in FIGURE 2 are achieved by suitable control of gas rates and gas inlet temperatures to the respective reactors. During heat-up periods, it is preferred to maintain gas inlet temperatures about 20–60° F. higher than the instantaneous average bed temperature, while during cool-down periods, average bed temperatures will normally be about 5–60° F. higher than inlet gas temperatures. It is preferred to maintain reactor inlet and outlet temperature differentials of less than about 100° F. in order to protect the catalyst against rapid generation of water in the inlet portion of the bed and undesirable adsorption thereof on cooler downstream portions of the catalyst bed.

With both catalyst beds at an initial 100° F., heat-up is commenced by means of preheaters 12 and 34 at a rate sufficient to provide an average bed temperature increase in both reactors of about 20–60° F. per hour. It is desired to commence the sulfiding of hydrofining catalyst at bed temperatures of about 150°–250° F., but before sulfiding is initiated it is desirable to raise the bed temperatures in the hydrocracker to about 300–400° F. To achieve this objective, bed temperatures in the hydrofiner are illustratively leveled out at about 200° F., until hydrocracking catalyst bed temperatures reach about 350° F. At this point, hydrogen sulfide is admitted via line 10 to the recycle gases entering hydrofiner 2, normally at a rate sufficient to provide about 0.2–20 mole-percent therein. Inlet gas temperatures to the hydrofiner are then increased at a rate sufficient to provide about 20–60° F. bed temperature increase per hour until temperatures in the range of about 550–900° F., are reached, illustratively 700° F. The final sulfiding temperature is preferably maintained for a period of at least about 4 hours, illustratively 9 hours. At this point sulfiding of the hydrofining catalyst is substantially complete.

Throughout the sulfiding of the hydrofining catalyst, copious quantities of water are evolved and passed via line 14 through hydrocracker 6. During this entire sulfiding cycle, the bed temperatures in hydrocracker 6 are preferably maintained at levels between about 300–400° F., illustratively 350° F. If tempertaures in excess of 450° F. are reached in the hydrocracker while water vapor from the hydrofiner is passing therethrough, substantial damage to the hydrocarcking catalyst may result. But if temperatures in the hydrocracker are allowed to fall below about 250° F., a very large portion of the water vapor passing through the hydrocracker will become adsorbed on the hydrocracking catalyst. If this is permitted to occur, then a much longer period of time will be required to desorb water and activate the hydrocracking catalyst without damaging the activity thereof. It is highly desirable to minimize the overall time required for the activation.

To maintain the desired intermediate temperatures in hydrocracker 6 during sulfiding of the hydrofining catalyst, it will be necessary to circulate a substantial portion of cool recycle gas via line 36 to mingle with the hot gases entering hydrocracker 6 via line 14. Cooling the effluent from hydrofiner 2 in this manner also is advantageous in that it decreases the partial pressure of water vapor in the total input gases to hydrocracker 6, the recycle gas in line 36 being substantially drier than the gases in line 14, due to cooling and condensing in high-pressure separator 22.

Upon completion of sulfiding of the hydrofining catalyst, it is preferable to continue to maintain a substantial partial pressure of hydrogen sulfide in the recycle gases in order to keep the hydrofining catalyst in a sulfided state. Suitable hydrogen sulfide concentrations may range between about 0.1 and 10% by volume. If the hydrogenating metal on the hydrocracking catalyst in reactor 6 is an iron group metal, e.g., cobalt or nickel, any of these hydrogen sulfide concentrations will effect a substantially complete sulfiding thereof. However, if the hydrogenating component is a Group VIII noble metal, e.g., palladium or platinum, $H_2S/H_2$ ratios above about 0.03 are required in order to effect any substantial sulfiding of such metals, due to the thermodynamics of the reactions:

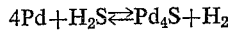

$$4Pd + H_2S \rightleftarrows Pd_4S + H_2$$

and

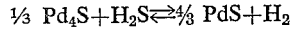

$$\tfrac{1}{3}\, Pd_4S + H_2S \rightleftarrows \tfrac{4}{3}\, PdS + H_2$$

(Bull. Chem. Soc., Japan, vol. 35, No. 9, pages 1543–45). As indicated previously, it is optional as to whether activation of the hydrocracking catalyst is carried out with concomitant sulfiding, although in the case of the iron group metal catalyst sulfiding can be avoided only by substantially completely eliminating $H_2S$ from the recycle gas after sulfiding of the hydrofining catalyst is completed. In the case of the noble metal hydrocracking catalyst, sulfiding is sometimes desirable to increase the activity for hydrocracking aromatic hydrocarbons and for obtaining maximum iso-paraffin/normal paraffin ratios in the hydrocracked products.

From the point at about 26 hours in FIGURE 2, where start of activation is indicated on graph 44, it is necessary to maintain careful control over temperatures and water partial pressures in the hydrocracker. The principal objective is to remove adsorbed and chemically generated water during the activation in a carefully controlled manner so as to avoid high water vapor partial pressures as the temperature increases. These objectives are obtained primarily by raising the catalyst bed temperatures at a relatively slow rate, regulated in response to the dew point of effluent gases from the reactor. Also, it is preferable to maintain relatively high recycle gas rates in the range of about 40–200 s.c.f. per pound of catalyst per hour. It is desirable to keep the maximum partial pressure of water vapor in the reactor at values below about 5 p.s.i.a., and preferably below 3 p.s.i.a., at all catalyst bed temperatures above about 400° F. At catalyst bed temperatures above about 500° F., the maximum water vapor partial pressure should be controlled at values below about 3 p.s.i.a., preferably below 1 p.s.i.a.

In the preferred modification illustrated in FIGURE 2, which is illustrative of an operation carried out at about 1,000–1,200 p.s.i.g., activation is initiated at the 26-hour point by gradually increasing the inlet temperatures to hydrocracker 6 at a rate not in excess of about 50° F. per hour, illustratively 30° F. per hour. Effluent gases from the reactor are passed continuously through a dew point analyzer, not shown, and when any dew point exceeds about 20–30° F. (at atmospheric pressure), the rate of heating the inlet gases is decreased. These heat-up rates, of course, pertain only to operations carried out at the preferred gas rates; at higher gas rates, a more rapid heat-up is permissible while still maintaining the desired effluent gas dew point.

At about the 450° F., temperature level, it is preferable to line out reactor temperatures for several hours, illustratively 6 hours, until the dew point of the effluent gases falls to less than about 10° F., preferably less than 5° F., above the dew point of the inlet recycle gas. When this stable condition is reached, heat-up is resumed, preferably at a slower rate of about 10–40° F. per hour, controlled to maintain the dew point of effluent gases below about 20° F., preferably below about 6° F. After reaching the maximum activation temperature of about 600–800° F., illustratively 700° F., temperatures are again lined out until a steady state is reached with effluent gas dew points being within about 5–10° F., of inlet gas dew points. When this point is reached, the activation may be considered complete, and the reactor is cooled gradually to lower temperature levels desired for startup of the hydrocracking process illustratively about 300° F. During the activation and/or cool-down cycles for hydrocracker 6, temperatures in the hydrofiner are also reduced as illustrated to the desired process start-up levels.

By proceeding as above described, complete activation of both catalyst beds is achieved in about 60–66 hours, and both catalysts are at maximum activity levels for initiation of the desired hydrocracking process. If temperature level in the hydrocracker are allowed to rise above about 450° F., before substantial completion of the sulfiding of hydrofining catalyst, the resulting activity of the hydrocracking catalyst is significantly decreased. If temperature levels lower than about 250° F. and maintained in the hydrocracker during the hydrofiner sulfiding operation, then a much longer time is required to effect activation of the hydrocracking catalyst without damaging the same, resulting in an overall activation period often in excess of 100 hours.

The following example is cited to illustrate a specific application of the activation procedure described above, but is not to be considered as limiting in scope:

EXAMPLE

In a commercially designed hydrocracking plant substantially as described in FIGURE 1, activation is carried out utilizing initially an 85 volume-percent hydrogen recycle gas stream which, after about 6 hours, is modified by the addition of about 5 volume-percent of hydrogen sulfide. Total hydrogen sulfide consumption during the activation is approximately 400 pound moles, excluding bleed losses. The specific catalysts and conditions utilized are as follows:

TABLE I

|  | Hydrofiner | Hydrocracker |
|---|---|---|
| Catalyst inventory, lbs | 152,000 | 156,000 |
| Catalyst composition | 3.5% NiO<br>18% MoO$_3$<br>78% Al$_2$O$_3$ | 1% Pd on<br>Mg-H<br>Y-zeolite |
| Operating Pressure, p.s.i.g | 1,110 | 1,100 |
| Initial recycle gas rates, mm. s.c.f./d | 110 | 165 |
| Initial catalyst bed temperature, °F | 100 | 100 |
| Heat-up rates, °F./hr.: |  |  |
| 0–2.5 | 40 | 40 |
| 2.5–6 | 0 | 40 |
| 6–18 | 40 | 0 |
| 18–26 | 0 | 0 |
| 26–30 | −10 | 25 |
| 30–36 | −10 | 0 |
| 36–49 | −10 | 20 |
| 49–54 | −10 | 0 |
| 54–65 | −10 | −36 |

Upon activation of the catalyst system as described above, the respective catalyst activities are such that 22,000 barrels per day of a 28.3° gravity, 750° F. end-point blend of coker gas oil and catalytic cracking cycle oil (the blend containing 1.4 weight-percent sulfur and 0.16 weight-percent nitrogen) can be processed at 50 volume percent conversion per pass (feed-disappearance) to 400° F. end-point gasoline, under the following initial conditions:

TABLE II

|  | Hydrofiner | Hydrocracker |
|---|---|---|
| Pressure, p.s.i.g | 1,560 | 1,560 |
| LHSV | 1.35 | 1.50 |
| Average bed temperature, °F | 680 | 700 |
| H$_2$/Oil Ratio, m.s.c.f./b | 5 | 7.5 |

A substantially lower conversion results under these conditions when the catalyst system is activated without controlling the hydrocracking catalyst bed temperature to the 300–400° F. temperature range while the hydrofining catalyst is being sulfided.

The following claims are believed to define the true scope of the invention, said invention not being limited to the exemplary details described above.

We claim:

1. In a catalytic hydrofining-hydrocracking system wherein a hydrothermally unstable granular hydrocracking catalyst bed is arranged downstreamwardly from an upstream bed of a relatively hydrothermally stable granular hydrofining catalyst, and wherein both of said catalysts beds are initially in a calcined, oxidized state and at a relatively low temperature, the improved method for sulfiding and activating said hydrofining catalyst and activating said hydrocracking catalyst in a minimum time without substantial damage to either catalyst, which comprises:

(1) establishing and maintaining through steps 2–6 a contacting sequence in which a hydrogen-rich activation gas free of hydrocarbon feed is passed first through said hydrofining catalyst bed and then through said hydrocracking catalyst bed, said activation gas also comprising hydrogen sulfide through at least steps 2–4;

(2) gradually raising the temperature of said activation gas at the inlet to said hydrofining catalyst bed until both of said catalyst beds have reached an intermediate temperature range between about 250° and 450° F.;

(3) thereafter continuously cooling the inlet gas stream to said hydrocracking catalyst bed to maintain temperatures within said intermediate range therein until the sulfiding of said hydrofining catalyst bed is substantially completed as hereinafter defined in step 4;

(4) continuing the gradual increase of activation gas temperature at the inlet to said hydrofining catalyst bed until a terminal bed temperature range between about 550°–900° F. is reached therein, and maintaining bed temperatures within said terminal range until sulfiding of said hydrofining catalyst is substantially completed;

(5) after substantial completion of sulfiding of said hydrofining catalyst bed, gradually increasing the inlet activation gas temperature to said hydrocracking catalyst bed at a rate controlled and correlated with gas flow rates so as to maintain the maximum water vapor partial pressure in said hydrocracking catalyst bed at values below about 5 p.s.i.a. at all bed temperatures above about 400° F. and at below about 3 p.s.i.a. at all bed temperatures above about 500° F.; and (6) continuing said gradual increase in temperature of input activation gas to said hydrocracking catalyst bed until a terminal bed temperature range between about 550–900° F. is reached, and maintaining temperatures within said terminal range until said hydrocracking catalyst is substantially dehydrated.

2. A method as defined in claim 1 wherein said hydrofining catalyst comprises minor proportions of an iron group metal oxide and a Group VI–B metal oxide supported on a substantially non-cracking adsorbent oxide carrier.

3. A method as defined in claim 1 wherein said hydrocracking catalyst comprises a minor proportion of a Group VIII noble metal supported on a crystalline zeolitic cracking base.

4. A method as defined in claim 1 wherein a sufficient concentration of hydrogen sulfide is maintained in said activation gas to also effect sulfiding of said hydrocracking catalyst.

5. A method as defined in claim 1 wherein the gaseous effluent from said hydrocracking catalyst bed is continuously cooled to condense out water, and wherein a portion of the resulting dry activation gas is recycled to said hydrofining catalyst bed, and another portion thereof is recycled to the inlet of said hydrocracking catalyst bed in order to maintain temperature control over the total inlet gases to said hydrocracking catalyst bed.

6. A method as defined in claim 1 wherein the rate of heat-up of said hydrofining catalyst in step 2 is greater than the rate of heat-up of said hydrocracking catalyst in step 5.

7. In a catalytic hydrofining-hydrocracking system wherein a hydrothermally unstable granular hydrocracking catalyst bed is arranged downstreamwardly from an upstream bed of a relatively hydrothermally stable granular hydrofining catalyst, and wherein both of said catalysts beds are initially in a calcined, oxidized state and at a relatively low temperature, the improved method for sulfiding and activating said hydrofining catalyst and activating said hydrocracking catalyst in a minimum time without substantial damage to either catalyst, which comprises:

(1) gradually heating said hydrofining catalyst bed to a temperature above about 550° F. while passing therethrough a stream of activation gas free of hydrocarbon feed and comprising hydrogen and hydrogen sulfide to effect sulfiding thereof with resultant formation of a water containing effluent gas;

(2) during step 1, passing said effluent gas stream through said hydrocracking catalyst bed while maintaining bed temperatures between about 250° and 450° F. therein; and (3) upon completion of sulfiding of said hydrofining catalyst bed, continuing the flow of hydrogen-rich activation gas in series through said hydrofining and hydrocracking catalyst beds, while gradually heating said hydrocracking catalyst bed to a temperature above about 550° F. at a rate controlled and correlated with gas flow rates to maintain water vapor partial pressures therein below catalyst damaging values.

8. A method as defined in claim 7 wherein said hydrofining catalyst comprises minor proportions of an iron group metal oxide and a Group VI–B metal oxide supported on a substantially non-cracking adsorbent oxide carrier.

9. A method as defined in claim 7 wherein said hydrocracking catalyst comprises a minor proportion of a Group VIII noble metal supported on a crystalline zeolitic cracking base.

10. A method as defined in claim 7 wherein the gaseous effluent from said hydrocracking catalyst bed is continuously cooled to condense out water, and wherein a portion of the resulting dry activation gas is recycled to said hydrofining catalyst bed, and another portion thereof is recycled to the inlet of said hydrocracking catalyst bed in order to maintain temperature control over the total inlet gases to said hydrocracking catalyst bed.

11. A method as defined in claim 1 wherein the pressure in both the hydrofining and hydrocracking catalyst beds is maintained at between about 500 and about 2,000 p.s.i.g.

12. A method as defined in claim 1 wherein the pressure in both the hydrofining and hydrocracking catalyst beds is maintained at between about 1,000 and about 1,200 p.s.i.g.

13. A method defined in claim 7 wherein a sufficient concentration of hydrogen sulfide is maintained in said activation gas to also effect sulfiding of said hydrocracking catalyst.

14. In a catalytic hydrofining-hydrocracking system wherein a hydrothermally unstable granular hydrocracking catalyst bed is arranged downstreamwardly from an upstream bed of a relatively hydrothermally stable granular hydrofining catalyst, and wherein both of said catalysts beds are initially in a calcined, oxidized state and at a relatively low temperature, the improved method for reducing said hydrofining catalyst and reducing said hydrocracking catalyst in a minimum time without substantial damage to either catalyst which comprises:

(1) gradually heating said hydrofining catalyst bed to a temperature above about 550° F. while passing therethrough a stream of activation gas free of hydrocarbon feed and comprising primarily hydrogen, with resultant formation of a water-containing effluent gas;

(2) during step 1, passing said effluent gas stream through said hydrocracking catalyst bed while maintaining bed temperatures about 250° and 450° F. therein; and (3) upon completion of reducing said hydrofining catalyst bed, continuing the flow of hydrogen-rich gas in series through said hydrofining and hydrocracking catalyst beds, while gradually heating said hydrocracking catalyst bed to a temperature above about 550° F. at a rate controlled and correlated with gas flow rates to maintain water vapor partial pressures therein below catalyst-damaging values.

References Cited
UNITED STATES PATENTS

| | | | |
|---|---|---|---|
| 3,197,399 | 7/1965 | Wight et al. | 208—111 |
| 3,308,054 | 3/1967 | Duir et al. | 208—89 |

DELBERT E. GANTZ, Primary Examiner

A. RIMENS, Assistant Examiner

U.S. Cl. X.R.

208—111